United States Patent [19]
Kashihara

[11] Patent Number: 5,183,860
[45] Date of Patent: Feb. 2, 1993

[54] IMPACT RESISTANT MOLDABLE POLYACETAL RESIN COMPOSITIONS AND PROCESSES FOR MAKING SAME

[75] Inventor: Osamu Kashihara, Shizuoka, Japan
[73] Assignee: Polyplastics Co., Ltd., Osaka, Japan
[21] Appl. No.: 673,984
[22] Filed: Mar. 25, 1991
[30] Foreign Application Priority Data
Mar. 28, 1990 [JP] Japan .................. 2-82330
[51] Int. Cl.$^5$ .................. C08L 61/02; C08G 18/56
[52] U.S. Cl. .................. 525/398; 525/399; 525/452; 525/456
[58] Field of Search .............. 525/452, 456, 398, 399; 524/495, 496, 505

[56] References Cited
U.S. PATENT DOCUMENTS 4,119,607  10/1978  Gergen et al. ............... 524/505
4,689,373   8/1987  Auesbach et al. ............ 525/398
4,828,755   5/1989  Kusumger et al. ........... 524/495
4,968,756  11/1990  Silvis et al. ................... 525/456

Primary Examiner—John Kight, III
Assistant Examiner—John M. Cooney, Jr.
Attorney, Agent, or Firm—Nixon & Vanderhye

[57] ABSTRACT

Moldable polyacetal resin compositions include a polyacetal base resin and an impact resistant effective amount of a thermoplastic polyurethane resin melt-blended therewith. The polyacetal base resin is itself a mixture of ($A_1$) a low hydroxyl-containing (LHC) polyacetal resin having less than 50 mmol/kg hydroxyl groups in its molecule, and ($A_2$) a high hydroxyl-containing (HHC) polyacetal resin having greater than 50 mmol/kg hydroxyl groups in its molecule. The polyacetal resin compositions optionally may include a reactive compound having at least one reactive moiety to further enhance the desirable properties that are achieved by inclusion of the HHC polyacetal resin. The components are melt-blended and subjected to conditions (which typically occur during the melt-blending step) to allow the polyurethane resin to react with the HHC polyacetal resin. As a result, a compatibilizing copolymer is formed in situ so that the polyurethane resin is compatabilized with the LHC polyacetal resin thereby minimizing delamination and increasing weld strengths of molded articles formed of the same.

15 Claims, 1 Drawing Sheet

GATE

1

IMPACT RESISTANT MOLDABLE POLYACETAL RESIN COMPOSITIONS AND PROCESSES FOR MAKING SAME

FIELD OF THE INVENTION

The present invention relates generally to polyacetal resin compositions. More particularly, the present invention relates to a polyacetal resin composition which includes a polyacetal base resin and a thermoplastic polyurethane resin. More specifically, the polyacetal base resin is comprised of a mixture of a low hydroxyl-containing (LHC) polyacetal resin and a high hydroxyl-containing (HHC) polyacetal resin. The moldable polyacetal resin compositions of this invention provide for molded articles which exhibit high impact strengths, weld strengths and flex resistance properties with minimal delamination and extremely reduced mold deposits.

BACKGROUND AND SUMMARY OF THE INVENTION

Polyacetal resin is used in extremely diverse fields an an engineering plastic due to its excellent physical properties, such as mechanical, electrical and chemical properties (e.g. chemical and heat resistances). However, new end-use applications require further property improvements and/or enhancements for polyacetal resins.

For example, molded articles to be used as automobile components are expected to exhibit high impact resistance over a wide temperature range. In this connection, the addition of a thermoplastic polyurethane as an impact modifier has been proposed as a means for improving the impact resistance of a polyacetal resin (see, Japanese Patent Laid-Open Nos. 145243/1984 and 19652/1986). However, these prior proposals are disadvantageous due to the poor interfacial adhesion between the polyacetal resin and the thermoplastic polyurethane.

As a result, the functional effect of a polyurethane resin as an impact modifier cannot sufficiently be exhibited. In addition, the obtained molded article exhibits very low weld strength and may have surface delamination problems due to the incompatibility (poor interfacial adhesion) of the polyacetal and polyurethane resins. Delamination of the surface layers and/or decomposition of the polyacetal or polyurethane resins sometimes cause deposits to be formed on mold surfaces. These mold deposits will, in turn, cause dimensional distortion of the molded article and/or will lower the efficiency of the molding operation. Thus, even though the prior proposals to add polyurethane resin to polyacetal base resins does sometimes result in acceptable impact resistance properties being achieved, further improvements have been needed.

Broadly, the present invention resides in blending an impact-resistant effective amount of a polyurethane resin with a polyacetal base resin, wherein the polyacetal resin itself is a mixture of low and high hydroxyl-containing (LHC and HHC, respectively,) polyacetal resins. These LHC and HHC polyacetal resins thus are effective in improving the compatibility of a thermoplastic polyurethane with the polyacetal base resin generally. The resulting polyacetal resin compositions are moreover, free from the disadvantages noted above and exhibit excellent impact resistance properties by blending a thermoplastic polyurethane with a polyacetal base resin component comprised of a low hydroxyl-containing polyacetal resin and high hydroxyl-containing polyacetal resin.

More specifically, the present invention is preferably embodied in polyacetal resin compositions comprising a blend of (A) between about 99 to 40% by weight of a polyacetal base resin component and (B) between about 1 to 60% by weight of a thermoplastic polyurethane, characterized in that the polyacetal base resin component (A) is a mixture which includes between about 99.5 to 1 parts by weight of ($A_1$) a low hydroxyl-containing polyacetal resin which contains less than 50 mmol/kg hydroxyl groups in its molecule and ($A_2$) between about 0.5 to 99 parts by weight of a high hydroxyl-containing polyacetal resin containing greater than 50 mmol/kg hydroxyl groups in its molecule.

Further aspects and advantages of this invention will become more clear after careful consideration is given to the detailed description of the preferred exemplary embodiments thereof which follows.

BRIEF DESCRIPTION OF THE ACCOMPANYING DRAWINGS

The accompanying drawing is a schematic view of the test piece used in evaluating delamination and flex resistance properties according to the Examples below wherein FIG. 1(a) is a plan view of the test piece, FIG. 1(b) is a front view thereof, and FIG. 1(c) is an enlarged view of the bend formed in the test piece.

DETAILED DESCRIPTION OF THE PREFERRED EXEMPLARY EMBODIMENTS

Figure 1A:

The LHC polyacetal resin that may be used in the compositions of the present invention is a high-molecular weight polymer comprised of repeating oxymethylene units ($-CH_2O-$) which may be selected from among polyoxymethylene homopolymers, copolymers (including block copolymers) and terpolymers comprising oxymethylene units and a minor amount of other constituent units. These polymers may moreover be linear, branched or crosslinked.

The preferred homopolymer is generally prepared by the polymerization of anhydrous formaldehyde or a cyclic trimer thereof, i.e., trioxane. Generally, the homopolymer is stabilized against thermal decomposition by end-capping with a suitable moiety with greater stability as compared to the oxymethylene units.

The preferred copolymer on the other hand is a high-molecular weight polymer comprising between about 85 to 99.9% of repeating units randomly interspersed with higher oxyalkylene units represented by the following general formula:

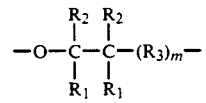

wherein $R_1$ and $R_2$, which may be the same or different, are each a hydrogen atom or an organic group selected from lower alkyls and halogenated lower alkyls, $R_3$ is a group selected from methylene, oxymethylene and lower alkyl- or halogenated lower alkyl-substituted oxymethylene groups; and m is an integer between 0 to 3. Preferably, each of the lower alkyl groups in the above general formula have 1 to 2 carbon atoms.

The preferred copolymer will have a number-average molecular weight of 5,000 or above and a melting point of 150° C. or higher. Such a copolymer is generally prepared by the copolymerization of formaldehyde or a cyclic oligomer thereof represented by the general formula $(CH_2O)_n$ where n is an integer of 3 or more, such as trioxane, with a cyclic ether and/or a cyclic formal. The obtained copolymer is generally stabilized against thermal decomposition by removing unstable terminal moieties by hydrolysis. Examples of the cyclic ether or formal comonomers include ethylene oxide, propylene oxide, tetrahydrofuran, dioxolane, oxepane, ethylene glycol formal, 1,4-butanediol formal and 1,6-hexanediol formal.

The preferred polyacetal terpolymer is prepared by using an additional polyfunctional monomer, such as diglycidyl ether in the above copolymerization scheme.

It is well known that, during the polymerization processes to form polyacetal resin as described above, extremely minor quantities of hydroxyl groups are sometimes introduced into the polyacetal molecule by the action of water and/or methanol contained in the monomer and/or comonomer components as impurities. In some cases, minor quantities of hydroxyl groups are introduced into the polyacetal molecule during the step of stabilization of the terminal moieties on the resulting polyacetal by esterification, etherification or hydrolysis. These low hydroxyl-containing polyacetals are commercially available and may satisfactorily be employed in the compositions of the invention. Thus, the term "low hydroxyl-containing" polyacetal resin is meant to refer to all polyacetal resins containing less than 50 mmol/kg of hydroxyl groups in the polyacetal molecule.

The preferred high hydroxyl-containing polyacetal resin that may be used in the compositions of the present invention is one which is prepared generally in a manner similar to that described above in connection with the LHC polyacetal, but additionally using a hydroxylated comonomer which is copolymerized with the other monomer components. Alternatively, the HHC polyacetal resin is prepared by reacting the terminal groups of the LHC polyacetal prepared by the process described above with a hydroxylated compound so as to introduce hydroxyl groups into the polyacetal molecule. The term "high hydroxyl-containing" polyacetal resin is meant to refer to polyacetal resins having greater than 50 mmol/kg, and preferably between 70 to 300 mmol/kg of hydroxyl groups in the molecule and an average molecular weight of between 500 to 100000. The quantity of hydroxyl groups in the molecules of both the LHC and HHC polyacetals are determined, for example, by the technique described in Applied Polymer Science, 38, 87 (1989) (expressly incorporated hereinto by reference).

Examples of the hydroxylated comonomer compound that may be used to prepare the HHC polyacetal resins include polyhydric alcohols, partial esters thereof, adducts of polyhydric alcohols or partial esters thereof with alkylene oxide, hydroxylated glycidyl ethers and glycidyl esters, hydroxylated cyclic acetals, and water.

The HHC polyacetal resin component is most preferably prepared by homopolymerizing formaldehyde or a cyclic oligomer thereof represented by the general formula $(CH_2O)_n$ (wherein n is an integer of 3 or above), or copolymerizing formaldehyde or a cyclic oligomer thereof with a cyclic ether or cyclic acetal such as ethylene oxide, dioxolane or 1,4-butanediol formal in the presence of a hydroxylated comonomer compound having at least three hydroxyl groups in its molecule to thereby introduce hydroxyl groups into the resulting polyacetal molecule. Particular examples of preferred hydroxylated comonomer compounds having at least three hydroxyl groups in the molecule that may be used in this process include compounds such as glycerin, trimethylolpropane, pentaerythritol, diglycerin, sorbitan, sorbitol, sorbitan monoester and diglycerin monoester; and adducts thereof with alkylene oxide such as ethylene oxide, propylene oxide or butylene oxide.

According to the present invention, the weight ratio of the LHC polyacetal resin component to the HHC polyacetal component (i.e. the weight ratio $A_1:A_2$) is between 99.5:0.5 and 1:99. Generally, the optimum ratio $A_1:A_2$ varies depending upon the degree of modification (hydroxyl content) of the HHC polyacetal resin. That is, when a HHC polyacetal resin having a hydroxyl content near the lower limit of 50 mmol/kg and which generally has a relatively high-molecular weight is used, it is preferable that the proportion of that HHC polyester resin component be higher. On the other hand, in the case where a HHC polyacetal resin is employed having a relatively high hydroxyl content (i.e. one where the hydroxyl content is between 70 to 300 mmol/kg) and which generally has a relatively low molecular weight, it is preferred that the proportion of that HHC polyacetal resin component be lower.

However, when the proportion of the HHC polyacetal resin is less than 0.5 part by weight, delamination between the polyacetal resin and the thermoplastic polyurethane will typically occur. The weight ratio of the LHC polyacetal resin component to the HHC polyacetal resin component is most preferably between 97:3 and 70:30.

Virtually any conventional thermoplastic polyurethane component may be used in the compositions of the present invention. Preferably, however, the thermoplastic polyurethane component used in the compositions of this invention is the reaction product of (i) a diisocyanate compound, (ii) a high-molecular weight polyol having a molecular weight of 500 to 5000, and (iii) a low-molecular weight polyol and/or polyamine having a molecular weight of 60 to 500.

Representative diisocyanate compounds include 1,4-butylene diisocyanate, 1,6-hexamethylene diisocyanate, cyclopentylene-1,3-diisocyanate, 4,4'-dicyclohexylmethane diisocyanate, isophorone diisocyanate, cyclohexylene-1,4-diisocyanate, 2,4-tolylene diisocyanate, 2,6-tolylene diisocyanate, mixtures of 2,4-tolylene diisocyanate with 2,6-tolylene diisocyanate, 4,4'-methylenebis)phenylisocyanate), 2,2-diphenylpropane-4,4'-diisocyanate, p-phenylene diisocyanate, m-phenylene diisocyanate, xylene diisocyanate, 1,4-naphthylene diisocyanate, 1,5-naphthylene diisocyanate, 4,4'-diphenyl diisocyanate, azobenzene-4,4'-diisocyanate, m- or p-tetramethylxylene diisocyanate and 1-chlorobenzene-2,4-diisocyanate, among which 4,4'-methylenebis(phenyl isocyanate), 1,6-hexamethylene diisocyanate, 2,4-tolylene diisocyanate and isophorone diisocyanate are preferable.

The high-molecular weight polyol (ii) that may be used to form the thermoplastic polyurethane serves as a soft segment of the polyurethane component and has a molecular weight of 500 to 5000, more preferably 1000 to 3000. The high-molecular weight polyol includes polyester diols (including polycarbonate diols) and polyether diols, each of which has hydroxyl groups at both terminal ends of the molecule. In addition, a small amount of a triol may be used as a part of the polyol component.

It is suitable that the polyester diol be one prepared from one or more dihydric alcohols and one or more dicarboxylic acids. The dicarboxylic acid constituting the polyester diol includes adipic, succinic, sebacic, suberic, methyladipic, glutaric, pimelic, azelaic, thiodipropionic and citraconic acids and mixtures thereof with a small amount of an aromatic dicarboxylic acid. The dihydric alcohol which is the other component of the polyester diol includes 1,3- and 1,2-propylene glycol, 1,4-butanediol, 1,3-butanediol, 2-methylpentanediol, 1,5-diethylene glycol, 1,5-pentanediol, 1,6-pentanediol, 1,12-dodecanediol and mixtures thereof. Furthermore, hydroxycarboxylic acids, lactones and carbonates, for example, ε-caprolactone and 3-hydroxybutyric acid may be used as the constituent of the polyester diol. The polyester diol is most preferably a diol of polyadipate, polylactone or polycarbonate.

On the other hand, the polyether diol is preferably a condensation product of one or more alkylene glycols, for example, ethylene glycol, 1,2-or 1,3-propylene glycol, 1.4-butanediol, 1,5-pentanediol or a mixture thereof. Another preferable polyalkylene ether glycol can be prepared from tetrahydrofuran. The polyether diol may also be an ether glycol prepared using ethylene oxide, propylene oxide and/or tetrahydrofuran (THF) as a comonomer, particularly as an irregular or block comonomer. Furthermore, a polyether copolymer prepared from THF and a small amount of 3-methyl THF may be used.

Preferred examples of the polyether diol include poly(tetramethylene ether) glycol (PTMEG), poly(propylene oxide) glycol, propylene oxide-ethylene oxide copolymers and tetrahydrofuranethylene oxide copolymers, among which poly(tetramethylene ether) glycol is still preferable. A diol having a hydrocarbon backbone chain, for example, polybutanediol, can also be suitably used.

The low-molecular weight polyol and/or polyamine having a molecular weight of 60 to 500 which is the third comonomer constituent of the thermoplastic polyurethane is one or more members selected from among straight-chain aliphatic diols and diamines and aromatic diols and diamines, and may contain a small amount of a triol. The component (iii) serves as a hard segment of the polyurethane and takes part in chain extension or crosslinking thereof.

Specific examples of low-molecular weight polyols include 1,2-ethanediol, 1,2-propanediol, 1,3-propanediol, 1,4-butanediol, 1,5-pentanediol, 1,6-hexamediol, 1,4-cyclohexanediol, ethylene glycol, propylene glycol, glycerin, hexanetriol, trimethylolpropane, hydroquinone diethylol ether and resorcinol ethylol ether. On the other hand, specific examples of the polyamine include diphenylmethanediamine, m-phenylenediamine and derivatives thereof. Still preferable examples thereof include ethylene glycol, propylene glycol, 1,2-ethanediol, 1,4-butanediol, 1,6-hexanediol, glycerin, hydroguinone diethylol ether, resorcincol ethylol ether and derivatives thereof.

The thermoplastic polyurethane is preferably one prepared by using the low-molecular weight polyol and/or polyamine component in an amount of about 0.2 to 5 equivalents per equivalent of the high-molecular weight polyol component. The amount of the high-molecular weight polyol component that is used affects the relative hardness of the composition—that is, greater amounts yield relatively softer polyurethanes.

According to the present invention, the amount of the thermoplastic polyurethane component to be used in the compositions is between about 1 to 60% by weight. On the other hand, the polyacetal resin component which is comprised of a mixture of the LHC and HHC polyacetals as described above is used in amounts between about 99 to 40% by weight. Preferably, the amount of the thermoplastic polyurethane is between 3 to 50% by weight, while that of the component is between 97 to 50% by weight. All weight percentages are based on the total composition weight. When the amount of the thermoplastic polyurethane is too small, the impact strength will not be sufficiently improved. However, when excessive amounts of polyurethane are used, then the characteristics inherent in a polyacetal resin will be adversely affected. Moreover, delamination of the thermoplastic polyurethane will be difficult to prevent even by the additional use of the HHC polyacetal resin.

Although the exact reasons why the addition of a HHC polyacetal in a blend of LHC polyacetal and polyurethane are not fully understood, it is surmised that a part of the hydroxyl groups of HHC polyacetal resin react with the isocyanate groups of the thermoplastic polyurethane or those generated by the thermal decomposition of the polyurethane during melt processing to form polyacetal/polyurethane copolymer. This copolymer is thus formed in situ and acts as a compatibilizing agent for the LHC polyacetal resin and the remainder (unreacted) thermoplastic polyurethane so as to enhance the affinity between the polyacetal base resin and the thermoplastic polyurethane. Thus, the polyacetal base resin and the thermoplastic polyurethane are homogeneously dispersed with one another to give phase structures wherein the polyurethane component is present in the form of discrete particles dispersed throughout a sea of polyacetal base resin, or wherein the polyurethane and polyacetal components (B) are intertwined with each other in a network-like state. These phase structures presumably contribute to the prevention of the delamination of the thermoplastic polyurethane and the noticeable improvement in impact resistance properties.

As noted above, the present invention is especially characterized by the use of a specifically modified HHC polyacetal and a conventional LHC polyacetal (A₁) as a polyacetal base resin component in a polyblend which also comprises an impact resistance effective amount of a polyurethane resin. Although compositions prepared by blending the LHC and HHC polyacetals with a thermoplastic polyurethane are sufficiently improved in impact resistance and exhibit adequate reduction in the delamination of the polyurethane. A reactive compound in an amount between about 0.01 to 10% by weight (based on the entire composition weight) may optionally also be blended therewith. The preferred reactive compound is one which includes a reactive group selected from isocyanate, isothiocyanate, epoxy, amino, mercapto and vinyl groups. Particularly, HHC and LHC polyacetals and the polyurethane are most preferably melt-kneaded in the presence of such a reactive compound so as to more effectively improve the impact resistance, toughness, flexural resistance and weld strengths of the resulting composition to reduce delamination of the molded article and mold deposits formed during molding.

Although the reactive compound may be one having a single reactive group, for example, an epoxysilane, aminosilane, mercaptosilane or vinylsilane compound, it most preferably is one having at least two reactive groups. Specific examples of preferred multifunctional reactive groups include those selected from isocyanate, isothiocyanate and epoxy groups. Particular examples thereof include 4,4'-methylenebis(phenyl isocyanate), 2,4-toluene diisocyanate, 2,6-toluene diisocyanate, xylene diisocyanate, 1,6-hexamethylene diisocyanate, isophorone diisocyanate, and 1,5-naphthalene diisocyanate; diisothiocyanates corresponding to the diisocyanates mentioned above; dimers and trimers of the diisocyanates and diisothiocyanates mentioned above; and derivatives prepared by protecting the isocyanate (—NCO) groups thereof; ethylene glycol diglycidyl ether, polyethylene glycol diglycidyl ether, propylene glycol diglydicyl ether, polypropylene glycol diglycidyl ether, neopentyl glycol diglycidyl ether, 1,6-hexanediol diglycidyl ether, trimethylolpropne triglycidyl ether, bisphenol A diglycidyl ether, hydrogenated bisphenol A diglycidyl ether, diglycidyl ether of adduct of bisphenol A with 2 propylene oxide molecules, diglycidyl terephthalate, diglycidyl isophthalate, diglycidyl phthalate, triglycidyl trimellitate, diglycidyl ester of 1,4-cyclohexanedicarboxylic acid and diglycidyl adipate. Although the above-mentioned reactive compounds are all effective, those having isocyanate or isothiocyanate groups are more effective from the aesthetic standpoint of coloration of the resulting composition during melt kneading, as well as the physical standpoints of preventing delamination of the polyurethane and improving the composition's impact resistance. Particularly preferred examples include 4,4'-methylenebis(phenyl isocyanate), isophorone diisocyanate, 1,5-naphthalene diisocyanate, 1,6-hexamethylene diisocyanate, 2,4-toluene diisocyanate, 2,6-toluene diisocyanate and modification products (derivatives) thereof such as dimers and trimers.

The addition of the reactive compound to the compositions of the present invention brings about an increase in the viscosity of the composition (i.e., a lower melt-index). Thus, it can be inferred that the reactive compound, particularly the hydroxyl groups of the HHC polyacetal resin and/or the thermoplastic polyurethane to partially form a three-dimensional structure in some cases. As a result, the presence of the optional reactive compound improves the affinity and/or interfacial adhesion between the polyacetal base resin component and the thermoplastic polyurethane component.

The compositions of the present invention may also contain various known stabilizers so as to enhance the stability thereof. Among such stabilizers, antioxidants, heat stabilizers (decomposition inhibitors) and weathering (light) stabilizers are particularly preferred optional components.

The antioxidants that may be used generally include sterically hindered phenols and amines. The heat stabilizers that may be used generally include hydroxides and inorganic salts of metals, metal salts of fatty acids and nitrogenous compounds such as amidine and amide compounds. The weathering (light) stabilizers that may be used generally include benzotriazoles, benzophenones, aromatic benzoates and hindered amines (piperidine derivatives having a sterically hindering group).

Furthermore, the composition of the present invention may optionally contain various other known additives typically employed in engineering resin compositions in order to improve the physical properties thereof depending upon the desired objectives. Specific examples of such additives include various colorants, lubricants, mold release agents, nucleating agents, surfactants, other polymers, organic high-molecular modifiers, and inorganic, organic and metallic and fibrous, powdery and flaky fillers, which may be used alone or as a mixture of two or more of the same.

Although the process for the preparation of the composition of the present invention or a molded article thereof is not particularly limited, the compositions or the molded articles can basically be prepared by melt-kneading the necessary components using conventional apparatus (e.g. single or twin-screw extruders). It is especially preferred that the melt-kneading be accomplished in the presence of the reactive compound, if used. The melt-kneading of the composition components is preferably conducted at a temperature of 270° C. or below for at least 30 seconds.

Molded articles formed of the compositions of the present invention can be prepared using conventional equipment and techniques for the preparation and molding of synthetic resin compositions. That is, the necessary components can be mixed together and melt-kneaded with a single- or twin-screw extruder or other kneader to provide a molding pellet, which can thereafter be molded. In order to facilitate the dispersion and mixing of the components, it is preferable to employ a process in which a part or the entirety of the resin components are finely ground, and then mixed with the other optional components to obtain a powder. The powder mixture is then melt-kneaded and molded into the desired article. Alternatively, a part of the components constituting the composition (for example, the reactive component and a part of the LHC and/or HHC components) may be melt-kneaded to form a master batch. The obtained master batch may then be further melt-blended together with the residual components to form the desired composition, which is subsequently molded into an article.

Although the compositions according to the present invention exhibit excellent physical properties as described above, further enhanced effects may be obtained in terms of improved physical properties and stability if the composition (or article formed thereof) is thermally treated at 80° C. or above after the composition or molded article has been formed.

The stabilizers and other additives may be added arbitrarily in any step. For example, they can be added and melt-blended, mixed with the composition just before the final molded article is fabricated.

As described above, the polyacetal resin composition of the present invention is generally comprised of a polyacetal base resin and a thermoplastic polyurethane wherein the polyacetal base resin is a mixture of a low hydroxyl-containing polyacetal and a high hydroxyl-containing polyacetal. The compositions of this invention show significant improvements in terms of impact resistance. In addition, problems typically associated with conventional polyacetal/polyurethane blends—e.g., delamination of the polyurethane and reduced weld strengths—have been addressed by means of the present invention. The polyacetal compositions of the present invention may therefore be used to form automobile parts (such as clips, fasteners, exterior trim parts and wheel covers); electrical and electronic components; and components and parts for business machines.

EXAMPLES

The present invention will now be described in more detail by referring to the following nonlimiting Examples.

Preparation of HHC polyacetal ($A_2$)-1

1500 ppm of glycerin was added to a mixture comprising 96 molar % of trioxane and 4 molar % of 1,3-dioxolane. The obtained mixture was polymerized using boron trifluoride ($BF_3$) as a polymerization initiator and the obtained polymer was stabilized using conventional techniques. The obtained HHC polyacetal resin had a weight-average molecular weight of 35000 and contained hydroxyl groups in its molecular chain in an amount of 150 mmol/kg.

Preparation of HHC polyacetal ($A_2$)-2

1000 ppm of trimethylolpropane was added to a mixture comprising 96 molar % of trioxane and 4 molar % of 1,3-dioxolane. The obtained mixture was polymerized using boron trifluoride ($BF_3$) as a polymerization initiator. The obtained HHC polyacetal resin had a weight-average molecular weight of 45000 and contained hydroxyl groups in its molecular chain in an amount of 100 mmol/kg.

Preparation of LHC polyacetal ($A_1$)

A polyacetal copolymer was prepared in the same manner as that employed in the preparation of HHC polyacetal ($A_2$)-1 except that no glycerin was added. The obtained polyacetal was a copolymer having a melt index (MI) of 27.0 and containing hydroxyl groups in an amount of 18 mmol/kg.

Examples 1 to 17 and Comparative Examples 1 to 4

As specified in Tables 1 to 3, the LHC polyacetal ($A_1$), the HHC polyacetals ($A_2$)-1 or ($A_2$)-2 and a thermoplastic polyurethane (B) were mixed together and melt-kneaded with a twin-screw extruder at a resin temperature of 210° C. to give a pelletized composition (Examples 1 and 2, 5 to 9 and 13 to 16).

The same procedure as that described above was repeated except that a reactive compound (C) consisting of isocyanate or isothiocyanate was further added. Pelletized compositions were then prepared (Examples 3, 4, 10, 11 and 17). In Example 12, a pelletized composition was prepared by mixing a HHC polyacetal ($A_2$) with a reactive compound (C), melt-kneading the obtained mixture with a twin-screw extruder at a resin temperature of 190° C. to obtain pellets, mixing the pellets with the residual components and then melt-kneading the obtained mixture. These pelletized compositions were then each injection molded into test pieces, which were evaluated for various properties.

For comparison, pelletized compositions not containing any HHC polyacetal ($A_2$) were prepared and evaluated. The results are given in Tables 1 to 3.

Figure 1B:
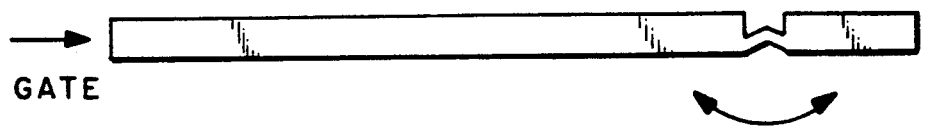

The following evaluation techniques were employed:
(1) melt index (MI):
melt index (g/10 min) was determined at 190° C. under a load of 2160 g.
(2) tensile strength:
determined according to ASTM D638.
(3) Izod impact test:
notched Izod impact strength (kg·cm/cm) was determined using a test piece having a thickness of 6.4 mm according to ASTM D 256.
(4) weld strength and elongation:
A test piece for weld evaluation having gates at both ends was prepared by molding and was examined for the strength (kg/cm$^2$) and elongation (%) at a weld according to ASTM D 256.
(5) delamination:
A test piece having a shape shown in accompanying FIGS. 1(a) and 1(b) was prepared and evaluated for surface appearance, delamination and mottling by visual observation using the following subjective scale:

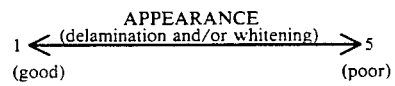

Figure 1C:
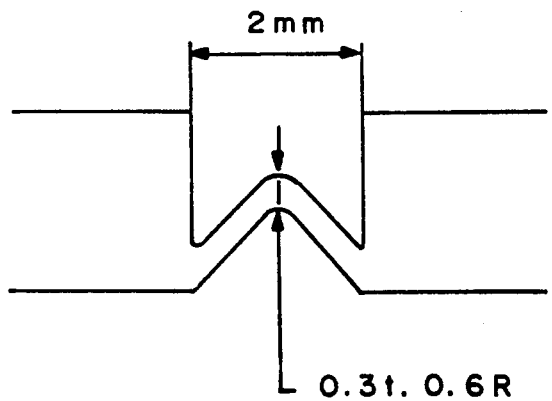

(6) flex resistance:
Ten (10) molded articles each having a hinge as shown in FIG. 1(c) were bent at an angle of 180° C. in the direction of the arrow in FIG. 1(b) at 23° C. and 50% RH and evaluated in terms of endurance.

The appearance of the bend was visually observed after each article was bent once at an angle of 180° C. and evaluated according to the following five subjective criteria, result of which is given in the Tables by an average of the ten samples.
1: virtually no abnormal changes observed
2: fine cracks generated in the bend causing whitening
3: fine but larger cracks with retained elasticity
4: bend was broken and connected only at the surface layer
5: bend completely broken.

TABLE 1

|  |  | Ex. 1 | Ex. 2 | Ex. 3 | Ex. 4 | Comp. Ex. 1 |
|---|---|---|---|---|---|---|
| A | | | | | | |
| $A_1$ | | | | | | |
| polyacetal | (% by weight) | 81 | 81 | 80.1 | 80.1 | 90 |
| $A_2$ | | | | | | |
| modified polyacetal ($A_2$)-1 | (% by weight) | 9 | — | 8.9 | 8.9 | — |
| modified polyacetal ($A_2$)-2 | (% by weight) | — | 9 | — | — | — |
| ($A_1$/$A_2$ weight ratio) | | (90/10) | (90/10) | (90/10) | (90/10) | (100/00) |
| B | | | | | | |
| thermoplastic polyurethane-1*[1] | (% by weight) | 10 | 10 | 10 | 10 | 10 |
| thermoplastic polyurethane-2*[2] | (% by weight) | — | — | — | — | — |
| C | | | | | | |
| isophorone diisocyanate trimer | (% by weight) | — | — | 1 | — | — |
| diisothiocyanate | (% by weight) | — | — | — | 1 | — |
| melt index | (g/min) | 15 | 13 | 3.6 | 4.2 | 23 |
| tensile strength | (kg/cm$^2$) | 452 | 454 | 460 | 464 | 460 |
| Izod impact strength | (notched) | 9.5 | 9.0 | 12 | 11 | 7.5 |

TABLE 1-continued

|  |  | Ex. 1 | Ex. 2 | Ex. 3 | Ex. 4 | Comp. Ex. 1 |
|---|---|---|---|---|---|---|
| weld strength | (kg·cm/cm) (kg/cm$^2$) | 304 | 297 | 447 | 428 | 242 |
| weld elongation | (%) | 10 | 10 | 15 | 14 | 8 |
| delamination | — | 2 | 2 | 1 | 1 | 4 |
| flex resistance | — | 3.4 | 3.6 | 2.4 | 2.7 | 4.8 |

*[1] polyether-type polyurethane [one prepared by using 4,4'-methylenebis(phenyl isocyanate) as diisocyanate]
*[2] polyester-type polyurethane [one prepared by using 4,4'-methylenebis(phenyl isocyanate) as diisocyanate]

TABLE 2

|  |  | Ex. 5 | Ex. 6 | Ex. 7 | Ex. 8 | Ex. 9 | Ex. 10 | Ex. 11 | Ex. 12 | Comp. Ex.2 |
|---|---|---|---|---|---|---|---|---|---|---|
| A |  |  |  |  |  |  |  |  |  |  |
| A$_1$ |  |  |  |  |  |  |  |  |  |  |
| polyacetal | (% by weight) | 72 | 60 | 40 | 8 | 72 | 71.1 | 71.1 | 71.1 | 80 |
| A$_2$ |  |  |  |  |  |  |  |  |  |  |
| modified polyacetal (A$_2$)-1 | (% by weight) | 8 | 20 | 40 | 72 | — | 7.9 | — | 7.9 | — |
| modified polyacetal (A$_2$)-2 | (% by weight) | — | — | — | — | 8 | — | 7.9 | — | — |
| (A$_1$/A$_2$ weight ratio) |  | (90/10) | (75/25) | (50/50) | (70/30) | (90/10) | (90/10) | (90/10) | (90/10) | (100/0) |
| B |  |  |  |  |  |  |  |  |  |  |
| thermoplastic polyurethane-1*[1] | (% by weight) | 20 | 20 | 20 | 20 | 20 | 20 | 20 | 20 | 20 |
| thermoplastic polyurethane-2*[2] | (% by weight) | — | — | — | — | — | — | — | — | — |
| C |  |  |  |  |  |  |  |  |  |  |
| isophorone diisocyanate trimer | (% by weight) | — | — | — | — | — | 1 | — | 1 | — |
| diisothiocyanate | (% by weight) | — | — | — | — | — | — | 1 | — | — |
| melt index | (g/min) | 12 | 10 | 10 | 9 | 11 | 2.2 | 2.3 | 1.8 | 18 |
| tensile strength | (kg/cm$^2$) | 378 | 372 | 341 | 328 | 383 | 375 | 381 | 380 | 386 |
| Izod impact strength | (notched) (kg/·cm/cm) | 13 | 14 | 13 | 13 | 13 | 16 | 15 | 20 | 10 |
| weld strength | (kg/cm$^2$) | 280 | 282 | 254 | 248 | 277 | 350 | 334 | 353 | 212 |
| weld elongation | (%) | 9 | 10 | 10 | 10 | 9 | 12 | 12 | 14 | 7 |
| delamination | — | 3 | 2 | 2 | 2 | 3 | 1 | 1 | 1 | 5 |
| flex resistance | — | 2.8 | 2.7 | 2.8 | 2.6 | 2.7 | 1.4 | 1.4 | 1.4 | 4.5 |

*[1] and *[2]: see Table 1

TABLE 3

|  |  | Ex. 13 | Ex. 14 | Comp. Ex.3 | Ex. 15 | Ex. 16 | Ex. 17 | Comp. Ex.4 |
|---|---|---|---|---|---|---|---|---|
| A |  |  |  |  |  |  |  |  |
| A$_1$ |  |  |  |  |  |  |  |  |
| polyacetal | (% by weight) | 63 | 63 | 70 | 72 | 72 | 71.1 | 80 |
| A$_2$ |  |  |  |  |  |  |  |  |
| modified polyacetal (A$_2$)-1 | (% by weight) | 7 | — | — | 8 | — | 7.9 | — |
| modified polyacetal (A$_2$)-2 | (% by weight) | — | 7 | — | — | 8 | — | — |
| (A$_1$/A$_2$ weight ratio) |  | (90/10) | (90/10) | (100/0) | (90/10) | (90/10) | (90/10) | (100/0) |
| B |  |  |  |  |  |  |  |  |
| thermoplastic polyurethane-1*[1] | (% by weight) | 30 | 30 | 30 | — | — | — | — |
| thermoplastic polyurethane-2*[2] | (% by weight) | — | — | — | 20 | 20 | 20 | 20 |
| C |  |  |  |  |  |  |  |  |
| isophorone diisocyanate trimer | (% by weight) | — | — | — | — | — | 1 | — |
| diisothiocyanate | (% by weight) | — | — | — | — | — | — | — |
| melt index | (g/min) | 7 | 7 | 14 | 17 | 15 | 2.0 | 24 |
| tensile strength | (kg/cm$^2$) | 328 | 327 | 325 | 378 | 381 | 383 | 385 |
| Izod impact strength | (notched) (kg·cm/cm) | 17 | 16 | 13 | 14 | 14 | 16 | 10 |
| weld strength | (kg/cm$^2$) | 229 | 218 | 171 | 283 | 279 | 354 | 230 |
| weld elongation | (%) | 6 | 6 | 4 | 10 | 10 | 12 | 7 |
| delamination | — | 3 | 3 | 5 | 3 | 3 | 1 | 5 |
| flex resistance | — | 2.5 | 2.7 | 4.0 | 3.1 | 3.3 | 1.3 | 4.8 |

*[1] and *[2]: see Table 1

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A moldable polyacetal resin composition comprising a polyacetal base resin ad an impact resistant effective amount of a thermoplastic polyurethane resin melt-blended with said polyacetal base resin, wherein said polyacetal base resin consists essentially of a mixture of (A$_1$) a low hydroxyl-containing polyacetal resin having less than 50 mmol/kg hydroxyl groups in its molecule, and (A$_2$) a high hydroxyl-containing polyacetal resin having between 70 to 300 mmol/kg hydroxyl groups in its molecule, and wherein said high hydroxyl-containing polyacetal resin and said low hydroxyl-containing polyacetal resin are respectively present in a weight ratio A$_1$:A$_2$ of between 97:3 to 70:30.

2. A moldable polyacetal resin as in claim 1, wherein said high hydroxyl-containing polyacetal resin has an average molecular weight of between 500 to 100,000.

3. A moldable polyacetal resin composition as in claim 1, wherein said low and high hydroxyl-containing resins are selected from polyacetal homopolymers, copolymers and terpolymers.

4. A moldable polyacetal resin composition as in claim 1, wherein said polyurethane resin is the reaction product of (i) a diisocyanate compound, (ii) a high-molecular weight polyol having a molecular weight of 500 to 5000, and (iii) a low-molecular weight polyol and/or polyamine having a molecular weight of 60 to 500.

5. A moldable polyacetal resin composition as in claim 1, wherein said polyurethane resin is present in an amount between about 1 to about 60% by weight based on the total composition weight.

6. A moldable polyacetal resin composition as in claim 1, wherein said polyacetal base resin is present in an amount between about 40% to about 99% by weight based on the total composition weight.

7. A moldable polyacetal resin composition as in claim 1, which further comprises between about 0.01 to 10% by weight, based on the total composition weight, of a reactive compound having at least one reactive moiety selected from the group consisting of isocyanate, isothiocyanates, epoxys, aminos, mercaptos and vinyl groups.

8. A molded article which consists essentially of the polyacetal resin composition as in claim 1.

9. A method of making a moldable polyacetal resin composition comprising the steps of:

providing a polyacetal resin base resin which is a mixture of ($A_1$) a low hydroxyl-containing polyacetal resin having less than 50 mmol/kg hydroxyl groups in its molecule, and ($A_2$) a high hydroxyl-containing polyacetal resin having between 70 and 300 mmol/kg hydroxyl groups in its molecule, said high hydroxyl-containing polyacetal resin and said low hydroxyl-containing polyacetal resin being respectively present in said base resin in a weight ratio $A_1:A_2$ of between 97:3 to 70:30;

melt-blending said polyacetal base resin and an impact resistant effective amount of a thermoplastic polyurethane; and then subjecting the melt-blended polyacetal base resin and polyurethane resin to conditions sufficient to effect a reaction between said high hydroxyl-containing polyacetal resin and said polyurethane resin thereby compatibilizing and polyurethane and said low hydroxyl-containing polyacetal resin.

10. A method of making a moldable polyacetal resin as in claim 9, wherein said high hydroxyl-containing polyacetal resin has an average molecular weight of between 500 to 100,000.

11. A method of making a moldable polyacetal resin composition as in claim 9, wherein said low and high hydroxyl-containing resins are selected from polyacetal homopolymers, copolymers and terpolymers.

12. A method of making a moldable polyacetal resin composition as in claim 9, wherein said polyurethane resin is the reaction product of (i) a diisocyanate compound, (ii) a high-molecular weight polyol having a molecular weight of 500 to 5000, and (iii) a low-molecular weight polyol and/or polyamine having a molecular weight of 60 to 500.

13. A method of making a moldable polyacetal resin composition as in claim 9, wherein said polyurethane resin is present in an amount between about 1 to about 60% by weight based on the total composition weight.

14. A method of making a moldable polyacetal resin composition as in claim 9, wherein said polyacetal base resin is present in an amount between about 40% to about 99% by weight based on the total composition weight.

15. A method of making a moldable polyacetal resin composition as in claim 9, which further comprises melt-blending in the composition between about 0.01 to 10% by weight, based on the total composition weight, of a reactive compound having at least one reactive moiety selected from the group consisting of isocyanates, isothiocyanates, epoxys, aminos, mercaptos and vinyl groups.

* * * * *

UNITED STATES PATENT AND TRADEMARK OFFICE
CERTIFICATE OF CORRECTION

PATENT NO. : 5,183,860

DATED : February 2, 1993

INVENTOR(S) : Osamu KASHIHARA

It is certified that error appears in the above-identified patent and that said Letters Patent is hereby corrected as shown below:

Column 1, line 23, after "fields" delete "an" and insert --as--.

Column 6, line 12, after "the" insert --polyacetal resin--;
   line 26, after "of" insert --the--;
   line 50, after "polyacetal" delete "$(A_1)$";
   line 57, after "polyurethane" insert a comma (,) and delete "A" and insert --a--.

Column 11, claim 1, line 2, after "resin" delete "ad" and insert --and--.

Signed and Sealed this

Twenty-third Day of November, 1993

*Attest:*

BRUCE LEHMAN

*Attesting Officer*    *Commissioner of Patents and Trademarks*